United States Patent Office 3,484,239

Patented Dec. 16, 1969

3,484,239

LIGHT-SENSITIVE POLYETHER REPRODUCTION LAYER

Hartmut Steppan, Wiesbaden-Dotzheim, Fritz Erdmann, Wiesbaden-Schierstein, Günter Messwarb, Kelkheim, and Walter Lüders, Neu-Isenburg, Germany, assignors to Kalle Aktiengesellschaft, Wiesbaden-Biebrich, Germany, a corporation of Germany No Drawing. Filed Jan. 4, 1967, Ser. No. 607,144
Claims priority, application Germany, Jan. 7, 1966, K 58,082
Int. Cl. G03c 5/00
U.S. Cl. 96—35.1 10 Claims

ABSTRACT OF THE DISCLOSURE

This invention relates to a reproduction layer which contains, as the light-sensitive component, novel polymers of the polyether type which undergo a reduction of solubility or become insoluble as a result of the action of light.

The preparation of light-sensitive vinyl polymers of the ketone type and their use in reproduction layers is already known. Thus, it has been proposed, e.g. in British patent specification No. 893,616, to use, as the light-sensitive component in reproduction layers, acetals of polyvinyl alcohol with aldehydes having the following general formula

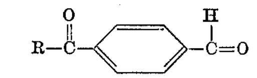

R=$CH_3$, aralkyl, or aryl. These acetals are obtained by a (normally heterogeneous) reaction of polyvinyl alcohol with the aldehydes, or their acetals formed with lower alcohols.

Further, polyketones, e.g. polyvinyl benzophenone, are known as components of light-sensitive reproduction layers, from U.S. Patent No. 2,831,768. The polymeric compounds disclosed in this patent are prepared by reaction of complete polymer chains, e.g. under the conditions of a Friedel-Crafts synthesis.

The present invention provides novel, negative-working, light-sensitive reproduction layers for the production of photographic copies, tanned images, relief images, and printing plates having improved characteristics.

Further, the present invention relates to a light-sensitive reproduction layer which is suitable for the production of photographic copies, tanned images, relief images and printing plates, and which contains at least one copolymer prepared from at least one epoxide of each of the following types I and II:

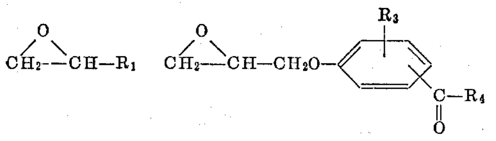

I II wherein:

$R_1$ is H, alkyl, aryl, halogenalkyl or $CH_2OR_2$, wherein $R_2$ is alkyl, allyl, vinyl or aryl, $R_3$ is H, alkyl, alkoxy, or halogen, and $R_4$ is alkyl, phenyl, alkylphenyl, alkoxyphenyl or halogenphenyl, if desired in admixture with such known additives as dyestuffs, pigments and fillers.

The reproduction layers according to the invention consist of or contain, as the light-sensitive component, polyethers of the acetophenone and/or benzophenone type which carry photo-active groups as side chains. The structure of these polyethers is illustrated by the following formula

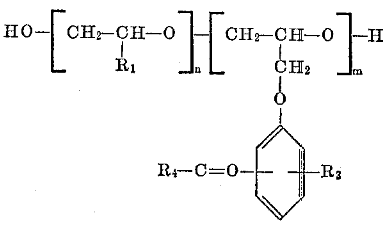

wherein:

$R_1$ is H; alkyl, preferably methyl or ethyl; aryl, preferably phenyl, methylphenyl, or halogenphenyl with fluorine, chlorine, bromine or iodine as the halogen group; or halogenalkyl, e.g. —$(CH_2)_nCl$, —$(CH_2)_nF$, wherein $n$ is 1 or 2, —$CHCl_2$, —$CHF_2$, —$(CH_2)_mCCl_3$, —$(CH_2)_mCF_3$, wherein $m$ is 0 or 1, —CHCl—$CH_2Cl$, —CHF—$CH_2F$; or —$CH_2$—$OR_2$ wherein $R_2$ is e.g., alkyl with 1 to 5 carbon atoms, allyl, vinyl, or aryl, preferably phenyl or alkylphenyl wherein alkyl contains from 1 to 5 carbon atoms;

$R_3$ is H; alkyl, preferably methyl or ethyl; alkoxy, perferably methoxy or ethoxy; or halogen, preferably chlorine or bromine;

$R_4$ is alkyl, e.g. with from 1 to 5 carbon atoms; phenyl, alkylphenyl, with alkyl containing from 1 to 5 carbon atoms; alkoxyphenyl, with alkoxy containing from 1 to 5 carbon atoms, or halogenphenyl, with fluorine, chlorine, bromine or iodine as the halogen group.

The subscripts $m$ and $n$ stand for whole numbers, and the ketone component should be incorporated in the copolymer in a quantity of at least 0.01 mole percent, preferably more than 0.1 mole percent, based on the quantity of the copolymer.

Of particular interest for the purposes of the invention are copolymers which contain 0.1 to 10 mole percent of the ketone component (II), based on the molar sum of the components of the copolymer. In principle, the amount incorporated may be even larger, but for economic reasons, a larger quantity of the ketone component (II) will not normally be employed, because the advantage obtained will not be sufficient to justify the incorporation of a larger quantity.

The polymers used in the invention as components of reproduction layers comprise copolymers in which the photo-reactive component is incorporated and arranged in an irregular distribution according to statistical probability, and such copolymers which, in the arrangement of their monomeric units and in their steric structure, resemble any of the mixed types of copolymers, e.g. block polymers in which the monomeric units are arranged in a head-to-tail order.

The reproduction layers of the invention may be used with great advantage in many fields. One of the technical advantages of the light-sensitive polymers is the fact that they can be more easily prepared than the substances hitherto known. Moreover, the polymer solutions obtained by the polymerization process can be directly used for coating. As a further advantage, even small quantities of light, of the wavelength range of about 2000 to 7000 A., change the novel reproduction layer to such an extent that, after image-wise exposure, copies of the original used may be prepared within a short time by a suitable developing process and application of a pigmented substance.

Reproduction layers which contain, as photo-active polymers, copolymers of ethylene oxide with photo-active oxiranes of Formula II, are of particular interest. Numerous polymers of this type, for instance those which are synthesized from 95 percent by weight or more of ethylene oxide units, are soluble in water as well as in anhydrous organic solvents, e.g. in aromatic substances, such as benzene or toluene. Reproduction layers prepared from such copolymers can be developed particularly well and easily with water or aqueous solutions. However, copolymers with a lower content of ethylene oxide, down to about 50 percent by weight, based on the weight of the copolymer, also may be developed with water or aqueous solutions. Solutions of the photo-active polymers in hydrocarbons have the advantage that they can be applied to many pre-coated layers which are not soluble in these hydrocarbons without dissolving the precoat. The same applies to the photo-active polymers of this invention which are insoluble in water. Other customary solvents, e.g. alcohol or dioxane, which are normally used together with known photo-active polymers, are much less suitable for application to a previously applied coating. Coating solutions containing organic solvents only are often preferred since they form more uniform layers on the support upon drying than do partially or completely aqueous solutions.

The copolymers of the invention have the further advantage that even when only small amounts of photo-active monomers, e.g. from 1 to 10 percent by weight (which, in the case of copolymers of ethylene oxide, corresponds to about 0.2 to 2 mole percent) are incorporated, reproduction layers are obtained which are so light-sensitive that, when the pigment process is applied, copies of an original may be produced within 1 to 5 seconds by the action of sunlight and within 2 minutes by the action of a 60 watt incandescent lamp at a distance of 10 cm. This means that only very small amounts of the expensive photo-active component must be incorporated in the polymer.

In contradistinction to known pigment processes, e.g. the so-called anthracotype process, which are positive-working dusting processes using reproduction layers having a smooth surface, the process performed with the reproduction layer of the invention is negative-working.

In the preparation of offset printing plates, it is an advantage of the reproduction layers of the invention that they permit a particularly simple performance of the so-called reversal process, without decoating, i.e. without removal of the light-hardened reproduction layer before printing, because the layer is hydrophilic.

If the process of the invention is used for decorating ceramics, it should be noted that, contrary to known processes, decorating may be performed by a negative-working pigment process.

Since the novel reproduction layer according to the invention may be on any desired support, such as metal (single metal or multi-metal plates), paper, plastic, glass, ceramics etc., or may be used in the form of a self-supporting film, it is suitable for many purposes. One of its application is, e.g. the preparation of printing plates, in particular for planographic and offset printing, and also for screen printing. Further, the novel reproduction material may be used for the preparation of printed circuits (etched resists) and printing plates for use in relief and intaglio printing. In addition, the reproduction layers according to the invention may be used for the preparation of originals for transfer printing.

An important field of application for the reproduction layers of the invention is the preparation of single copies on various supporting materials either by the contact process or by projection, e.g. re-enlargement from microfilms. Further, the reproduction layer of the invention may be used for applying image patterns or text, e.g. to machine housings, glass or ceramics, which then may be burned in after a suitable pigment or enamel color has been applied. Alternatively, colors, pigments or phosphores may be incorporated in the reproduction layer. In this case, the areas of the layer not struck by light during exposure may be washed away so that colored images are obtained, which then may be burned in if desired (tanned and relief images, if desired Braille).

On transparent supporting material, colored copies also may be prepared from color separation negatives, which may be superimposed and combined to form a colored image.

The reproduction layer of the invention may be combined with known reproduction layers. Thus, the photo-active polyethers may be incorporated in known reproduction layers, e.g. diazotype layers, or in photopolymer reproduction layers, espectially those which in addition contain polyethers which are not photo-active, e.g. polyethylene oxide.

The light-sensitive polymers used as reproduction coating material in accordance with the present invention are prepared by copolymeriaztion of epoxides of the following general formulae

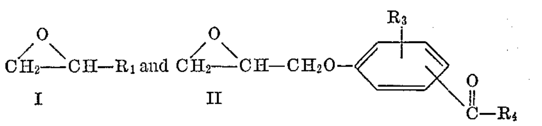

in the presence of ionic catalysts which, under the polymerization conditions prevailing, cause ring opening of the oxirane rings.

The following compounds are used, for instance, as ketone components II in the preparation of the copolymers used in a coating composition:

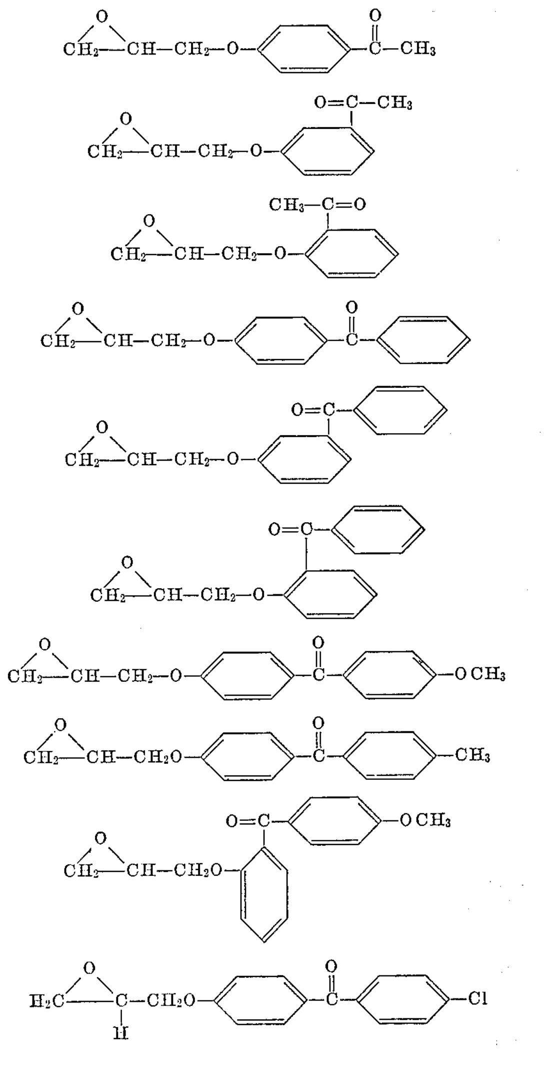

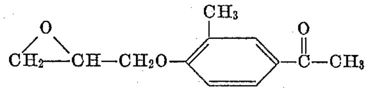

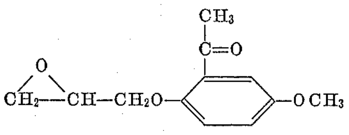

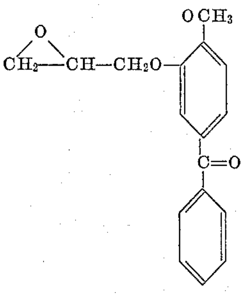

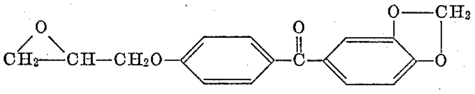

The following compounds may be used, e.g., as components I: ethylene oxide, propylene oxide, 1,2-butylene oxide, styrene oxide, epichlorohydrin, epibromohydrin, vinylglycidyl ether, allyl glycidyl ether, and phenyl glycidyl ether; in particular ethylene oxide propylene oxide, epichlorohydrin and phenyl glycidyl ether.

In the polymerization reaction, ionic catalysts are suitable which, under the conditions of the polymerization process, cause an opening of oxirane rings. Alkali hydroxides and alkaline earth hydroxides may be used, e.g., as catalysts, also calcium amide, zinc carbonate, iron (III)-chloride, iron (III)-alkoxides, iron (III)-salts, $SbCl_5$, $SnCl_4$, $BF_3$, and $BF_3$-etherate. The preferred catalysts are organic compounds of the metals aluminum, zinc and magnesium corresponding to the general formula $$MeR'R''_{x-1}$$

wherein

Me is a metal of the valence $x$,
R' is alkyl, preferably methyl or ethyl, and
R'' is H, alkyl, preferably methyl or ethyl, alkoxy, preferably methoxy or ethoxy, or hydroxyl.

The last-mentioned catalysts are prepared in known manner from metal alkyls to which exactly defined small quantities of water and complex formers are added.

Copolymerization is effected at temperatures ranging from 20 to 100° C. preferably from 30 to 80° C. Suitable solvents for performing the polymerization process are, e.g., aliphatic, aromatic and alicyclic hydrocarbons, preferably aliphatic hydrocarbons with boiling points between 50 and 150° C., benzene, toluene, chlorinated hydrocarbons, preferably carbon tetrachloride, and, if desired, ether.

It has been found to be advantageous to exclude the action of daylight and normal room light during the polymerization reaction and the ensuing processing of the polymer products. The cross-linking process proceeds considerably slower in solution than in the solid material.

Advantageously, copolymerization should be effected with the exclusion of oxygen, e.g in a nitrogen atmosphere. It is absolutely necessary to prevent the access of moisture insofar as possible.

Preferably, polymers which are solid at room temperature are used in the reproduction layer of the invention. However, polymers which are pasty or liquid at normal temperature also may be employed.

Generally speaking, the effects obtained by exposure of copolymers which contain compounds of the benzophenone type as component II are superior to those obtained with corresponding copolymers containing compounds of the acetophenone type. Further, the effects are normally more pronounced in the case of copolymers containing, as component II, compounds in which the glycidoxy group is in o-position to the ketone carbonyl group.

The solubility characteristics of the copolymers vary within wide limits, depending upon the substituents $R_1$ to $R_4$. For instance, the copolymers of ethylene oxide (component I; $R_1$=H), are at least partially soluble or dispersible in water even with relatively high contents of component II. By choosing different components I, e.g. propylene oxide or epichlorohydrin ($R_1$=$CH_3$ or $CH_2Cl$), copolymers are obtained which are insoluble in water. By an additional incorporation of ethylene oxide, however, copolymers again may be obtained which are at least partially soluble or dispersible in water.

Preferably, not more than 60 to 70 percent by weight of component I wherein $R_1$ is aryl, $CH_2$-halogen, or wherein $R_2$ is aryl, and not more than 20 percent by weight of component I with $R_2$=allyl or vinyl should be incorporated in the polymer, since the incorporation of larger quantities may result in an undesirable low solubility of the (unexposed) polymer, as a result of which processing is impeded.

By exposing the polymers to light of a wavelength between 2000 and 7000 A., their solubility in solvents which dissolve the unexposed polymers is reduced or eliminated. Particularly suitable light sources are those which emit a high proportion of ultra-violet radiation, e.g. between 3000 and 4000 A. However, light sources which emit a small proportion of actinic light, e.g. the incandescent tungsten lamps normally used for room illumination, also may be used. Further, all types of lamps customarily used in reproduction processes may be used as light-sources, e.g. carbon arc lamps, xenon lamps, mercury vapor lamps, actinic and superactinic luminous substance lamps, and photographic flood lights. Sunlight also is suitable.

Image-wise exposure of the reproduction layers of the invention may be effected with varying exposure times and in different ways, depending on the combination of substances present, the supporting material used, and the desired result. The feasible possibilities range from a contact exposure in a vacuum frame with a plastic or glass cover to exposure by means of a projector or in a camera, if desired with simultaneous enlargement or reduction of scale. Accordingly, the exposure time may range from a fraction of a second to several hours.

Depending on the composition of the photo-active copolymers, copolymers and light-decomposition products thereof are obtained which possess a variety of gradated physical properties. For instance, copolymers which contain as component I primarily compounds in which $R_1$ is not hydrogen, are difficultly soluble or insoluble in water and oleophilic, i.e., they accept the usual greasy printing inks. If the copolymers contain, as component I, only or preponderantly ethylene oxide (in which $R_1$=H), light-decomposition products are obtained which are more or less hydrophilic, i.e. they accept greasy ink less readily or not at all.

Copolymers which contain, as component I, more than 50 percent by weight of ethylene oxide, are a particularly valuable group of compounds within the scope of the present invention, since they permit development of the image-wise exposed reproduction layer with water or with solvents with a high water content.

Copolymers of this type with a high percentage of ethylene oxide, which yield hydrophilic light-decomposition products, permit a particularly simple and thus technically advantageous execution of the so-called reversal process for the preparation of offset plates, because the light-hardened reproduction layer need not be removed before printing.

For the preparation of the reproduction material, the reproduction layers according to the invention are applied to the support in known manner, e.g. by coating, whirl-coating, swabbing, dip-coating, or roller application, or by laminating the reproduction layer in the form of a self-supporting film to a support, and the layers are then dried with a current of warm air. Especially when thicker layers are to be applied, it may be advisable to pre-coat the support with an antihalation coating.

The usual additives, such as dyestuffs, sensitizers, pigments, wetting agents, plasticizers, anti-oxidants and stabilizers against thermal decomposition, as well as organic and inorganic fillers, may be incorporated in the reproduction layers. Suitable organic fillers are, e.g. photo-inactive polyethers, e.g. homopolymers or copolymers of different epoxy resins of the above defined type I, or other polymers which are compatible with the photo-active polymers, e.g. from the vinyl polymer series. Suitable inorganic fillers are, e.g., glass powder, silicon dioxide in extremely fine distribution, clay and the like. These additives must be selected in such a manner, however, that they affect as little as possible the optical transparency of the reproduction layer in the main range of absorption of the light-sensitive copolymers.

Depending on the type of light-sensitive polymers used, development of the image-wise exposed reproduction materials may be effected with water or organic solvents, e.g. lower aliphatic alcohols, such as methanol or ethanol, carboxylic acid esters, such as methyl acetate or ethyl acetate, aliphatic ketones, such as methylethyl ketone or acetone, aromatic hydrocarbons, such as benzene or toluene, or ethers, such as dioxane and tetrahydrofuran, or with mixtures of such organic solvents with one another or with water.

If they do not already contain dyestuffs, the exposed areas of the layer may be dyed, e.g. with aqueous dyestuff solutions, or with solutions of dyestuffs in organic solvents, or with greasy printing ink, depending on the characteristics of the particular layer, in order to improve the visibility of the image obtained.

In a preferred modification of the method for dyeing the image, which is particularly suitable for water-developable reproduction layers and the preparation of single copies, the dry layer is dyed, after exposure, with a very finely pulverized organic or inorganic pigment and then developed by spraying with water. During the spraying process, the pigment is removed much earlier from the areas not struck by light than from the light-struck areas. By this process, sharp copies which are fast to light may be produced with short exposure times in any desired color.

Particularly in the case of the above-described pigment process, and also when other processing methods are employed, the following should be borne in mind: It is possible, but not advisable to use a supporting material which has an extremely smooth surface. Advantageously, the support should be superficially roughened by mechanical or chemical methods because this improves the adhesion of the reproduction layer. A surface with particularly favorable properties in this respect is, e.g., electrolytically roughened aluminum foil. Since the functioning of the reproduction layers according to the invention can be demonstrated on this kind of support without problems of lack of adhesion, this support is preferably used in the following examples.

Especially when the pigment process is to be performed, a reproduction layer of such a thickness must be applied, that all protruding grain peaks of the support are completely covered by the reproduction layer. Otherwise, the pigment would be retained by the uncovered grain tops from which it could be removed only with difficulty, or not at all, in the ensuing washing process. The smoother the surface, the thinner the reproduction layer which can be applied, which is of advantage because of the shorter exposure times applicable. An unduly extended exposure time may reduce the receptivity of the light-struck areas for the pigment and their anchorage thereto.

During development with a water spray, a low water pressure is preferably applied. In the case of unfamiliar layers, the developing characteristics of which are not yet known, development is begun at a very low water pressure, which is then increased until development proceeds with satisfactory speed and safety. As a side feature of this process, the pigment adhering to the light-struck areas is covered with a solution of the unexposed reproduction layer in water. As a consequence, a pigment copy is obtained upon drying which is relatively fast to marring. The fastness to marring and wiping may be further increased by subjecting the copy to a brief after-exposure.

The reproduction layer of the invention is further illustrated by the following examples. Percentages are by weight; the temperature references are to degrees centigrade.

In the examples, a number of dyestuffs and pigments are used:

Heliogen Blue B (powder), Color Index No. 74160,
Victoria Blue B (powder), Color Index No. 44045,
Fatty Red HHR, a dyestuff of the formula $C_{22}H_{16}N_4O$ which is prepared by coupling diazotized 4-aminoazobenzene with β-naphthol,
Paratoner B, Schultz' "Farbstofftabellen," 7th edition, vol. 1, 1931, No. 60,
Carbon Black FW2 (for paints), medium particle size 118 A. (marketed by Degussa, Frankfurt).

EXAMPLE 1

100 parts by weight of a 0.76 percent solution in benzene of a copolymer prepared from 19 parts by weight of ethylene oxide and 1 part by weight of 4-glycidoxy benzophenone are mixed in a mortar with 1 part by weight of powdered Heliogen Blue B, suspended in 6 parts by volume of ethanol, until a homogeneous mixture is obtained. An electrolytically roughened aluminum foil is coated with this mixture and the coating is then briefly dried with a current of warm air. The material is image-wise exposed under a negative line original (light source: a tubular illuminating device having 13 Philips fluorescent tubes of the type TL–AK 40W/05 mounted in a plane of 60 x 60 cm.; distance from the lamp: 7 cm.; cover: a polyvinyl chloride film; exposure time: 2 min.). Upon development with a water spray, a deep blue positive tanned image is obtained on a clean background.

Instead of an aluminum foil, a thin polyester film which has been superficially roughened to improve adhesion also may be used as the support.

The above-mentioned copolymer is prepared as follows: 100 parts by weight of toluene, 9.5 parts by weight of ethylene oxide, 0.5 part by weight of 4-benzoylphenyl-glycidylether, and 6.15 parts by weight of a catalyst solution consisting of 4.12 parts by weight of aluminum triethyl dissolved in 11.23 parts by weight of n-heptane and 6.94 parts by weight of diethylether, 0.31 part by weight of water, and 1.76 parts by weight of acetyl acetone, are agitated for 5.5 hours in a nitrogen atmosphere at 60° C., using a polymerization vessel which is protected against light. Thereafter, the polymerization process is interrupted by the addition of 2 parts by weight of anhydrous ethanol.

After evaporation of the solvent at 50° C. under reduced pressure, a rubber-like solid substance is obtained in a yield of 46 percent.

EXAMPLE 2

A 0.76 percent solution in benzene of the same copolymer of ethylene oxide and 4-glycidoxy benzophenone as used in Example 1 is coated without further additives onto an electrolytically roughened aluminum foil and dried briefly. After image-wise exposure through a line negative (exposure time 30 seconds, other conditions as described in Example 1) and development by means of a water spray, a positive, still colorless tanned image is obtained which may be converted into a deep blue tanned image by drying, wiping with a 3 percent solution of Victoria Blue B in ethanol, and spraying again. If the support with the thus dyed tanned image is placed in intimate contact with a paper which had been slightly moistened with ethanol, or if the tanned image is moistened with ethanol, and the material then pressed onto dry paper, the dyestuff is transferred onto the paper as a pattern. This means that the tanned image may be used for reprinting.

If the support is coated for comparison purposes with polyethylene oxide with no 4-glycidoxy benzophenone incorporated therein, no tanned image is produced after image-wise exposure (exposure time 30 seconds, other conditions as stated in Example 1) and development with water. If 10 percent by weight of 4-glycidoxy benzophenone are added to the polyethylene oxide solution (calculated on the content of polyethylene oxide) and a physical mixture is prepared, again no tanned image is obtained after image-wise exposure (exposure time 30 seconds, other conditions as stated in Example 1) and development with water.

EXAMPLE 3

An electrolytically roughened aluminum foil is coated, on a plate whirler, with a 0.44 percent solution of a copolymer prepared as described in Example 1 from 19 parts by weight of ethylene oxide and 1 part by weight of 4-glycidoxy benzophenone and then dried for 1 minute at 100° C. In a normal printing frame, the material is exposed under a negative master for 2 to 3 seconds to sunlight. The plate is then divided into three zones. Zone I is dyed with Paratoner B powder, Zone II with powdered Heliogen Blue B, and Zone III with Carbon Black PW2 (for paints), using a pad of cotton. The pigment is readily accepted all over the layer. During subsequent treatment with a water spray, the pigment is removed from the areas not struck by light and a clearly defined, positive copy of the master is obtained in a strong red, blue or black color, depending on which pigment was used.

0.5 percent of dioctadecyl sulfide and 0.5 percent of di-(2 - methyl-5-tert.-butyl-4-hydroxyphenyl)-sulfide, calculated on the weight of the copolymer, may be added to the copolymer as stabilizers against oxidative decomposition.

EXAMPLE 4

The same coating solution as used in Example 3 is applied, in the same manner, to a sheet of baryta paper. Exposure is effected for 5 seconds to sunlight under a negative master. Then, the material is dyed with pigments as described in Example 3 and developed. Positive copies of good contrast are produced.

EXAMPLE 5

A clear cellulose acetate film of 0.1 mm. thickness is coated, on a plate whirler, with a 1 percent solution in benzene (to which 0.1 percent of acetic acid had been added) of the photo-active copolymer described in Example 1, and the film is then dried by means of a current of warm air. After exposure for 15 seconds under a negative master to the light of a three-phase point lamp of 40 amp. at a distance of 1 m. the film is either first dyed with a pigment e.g. Paratoner B, and then developed by spraying with water, or it is first developed with a water spray and the tanned image thus produced is then dyed with a dyestuff solution, e.g. an alcoholic solution of Victoria Blue B. Positive copies of the negative master are produced.

EXAMPLE 6

Plates of glass, unburned clay, or unburned porcelain are coated with the coating solution used in Example 5. In the case of very absorptive material, two coatings may be applied, of which the second is applied not before the first has been exposed for about 30 seconds, without an original, to the light of an arc lamp or another suitable light-source. Advantageously, the surface of the support should be slightly roughened. The thickness of the reproduction coating should be adjusted such that even the highest grain peaks protruding from the plane are thoroughly covered by the reproduction layer. In the case of relatively smooth supports, thinner reproduction coatings preferably are applied, while thicker coatings are applied to rougher supports. Naturally, longer exposure times will have to be selected for thicker reproduction coatings than for thinner coatings. Advantageously, the optimum exposure time for a particular combination of coating and support is determined by step-wise exposure.

After image-wise exposure, the entire layer is dyed with a suitable pigment, e.g. iron red, or a suitable enamel color ground to an extremely fine powder.

Development is effected by spraying with water, starting with a low water pressure and gradually increasing it. Treatment with water is interrupted as soon as the non-image areas are completely freed from pigment, while the pigment still adheres to the light-struck areas. After drying, the image may be burned in. It is one of the advantages of the reproduction layer of the invention that it contains only carbon, oxygen, hydrogen and some aluminum, i.e. no elements which form colored combustion residues, as do, e.g. reproduction coatings based on iron citrate or chromate/colloid coatings.

EXAMPLE 7

A bimetal plate (consisting of a thin copper layer on an aluminum support) is first carefully cleaned on its copper side and then coated with a 1.25 percent solution in a toluene/dioxane/ethanol mixture of a copolymer prepared from 12 parts by weight of propylene oxide, 7 parts by weight of phenylglycidyl ether, and 1 part by weight of 4-glycidoxy benzophenone. The plate is then dried for 4 minutes at 100° C., exposed for 20 minutes under a negative line original under the conditions stated in Example 1, and developed by bathing it for a short time in ethyl acetate.

The plate is then dried for 1 to 2 minutes at 100° C. and treated with an etching agent for copper surfaces, e.g. the so-called "Lithengrave Etch" marketed by Printing Developments Inc., New York; alternatively, an aqueous solution containing 45 percent of $Fe(NO_3)_3$ and 5 percent of calcium acetate may be applied. Etching is continued until the copper has been completely removed from the areas not struck by light and the aluminum support becomes visible. After removal of the light-hardened coating, e.g. by wiping with a 1:1 mixture of acetic acid and water, and after-treatment with an approximately 1.5 percent aqueous phosphoric acid solution, a positive offset printing plate is obtained which permits very long runs.

The above-mentioned copolymer is prepared as follows: 100 parts by weight of toluene containing 0.7 part by weight of phosgene as a polymerization-controlling agent, 6 parts by weight of propylene oxide, 3.5 parts by weight of phenylglycidylether, 0.5 part by weight of 4-benzoylphenylglycidylether, and 6.15 parts by weight of a catalyst solution consisting of 4.12 parts by weight of aluminum triethyl dissolved in 11.23 parts by weight of n-heptane and 6.94 parts by weight of diethylether, 0.31 part by weight of water and 1.76 parts by weight of acetyl acetone, are agitated for 7 hours at 60° C. in a nitrogen atmosphere, using a polymerization vessel which is protected against light. Thereafter, the polymerization process is interrupted by adding 2 parts by weight of anhydrous ethanol.

After evaporation of the solvent at 50° C. under reduced pressure, a rubber-like solid substance is obtained in a yield of 97 percent.

EXAMPLE 8

An electrolytically roughened aluminum surface, e.g. the front side of an apparatus, is coated with a layer by immersion in a 1 percent by weight solution of the copolymer used in Example 7 and then dried. The material is exposed for 1 to 2 minutes in contact with a negative of good transparency with writing thereon, using a conventional 60 watt incandescent tungsten lamp marketed by Philips, at a distance of 8 cm. After exposure, the material is developed with ethyl acetate. When the material is sprayed with a solution of Fatty Red HRR in alcohol or benzene, the light-struck areas of the layer adhering to the surface of the body accept the red dye and a true, red, positive copy of the writing on the original is obtained on the metal surface.

EXAMPLE 9

An electrolytically roughened aluminum foil is coated with a 1.25 percent solution of the copolymer described in Example 7. The layer is first dried with a current of warm air and then for 2 minutes after-dried at 100° C.

Exposure is for 10 minutes under a negative line original, under the conditions stated in Example 1. The material is then developed by bathing it in ethyl acetate. After drying, the material is treated with a 1.5 percent aqueous phosphoric acid solution and inked up with greasy ink. It then is cleaned with the same phosphoric acid solution and gummed in the customary manner. A positive offset printing plate is thus obtained from which a large number of prints can be made.

EXAMPLE 10

An electrolytically roughened aluminum foil is coated, on a plate whirler, with a 1.25 percent solution of a copolymer prepared according to the method described in Example 1, from 18 parts by weight of ethylene oxide and 2 parts by weight of 4-glycidoxy benzophenone, and then dried for 2 minutes at 100° C. After image-wise exposure (10 minutes) through a positive master, under the conditions stated in Example 1, and using the light source described in that example, the plate is developed by spraying with water, i.e. the parts of the coating not struck by light are washed away. After drying, the plate is treated with an etching solution of the composition stated below, cleaned with a water spray, and again dried. Then, the plate is treated with a deep etching lacquer consisting of 5.8 parts by weight of chlorinated rubber of a viscosity of 35–55 cp., 5.8 parts by weight of chlorinated rubber of a viscosity of 80–105 cp., 5 parts by weight of a resin acid-modified phenol resin, 67 parts by weight of xylene, 17 parts by weight of mesitylene, and 0.4 part by weight of Fatty Red HRR, dried, and the lacquer is removed from the light-hardened areas of the layer by wiping with a 1.5 percent aqueous solution of phosphoric acid. After inking with greasy ink, a highly efficient positive offset printing plate is directly obtained, i.e. without removal of the thoroughly hardened reproduction layer.

The solution used for etching has the following composition:

| | Parts by weight |
|---|---|
| $CaCl_2 \cdot 2H_2O$ | 41 |
| Water | 44 |
| $ZnCl_2$ (desiccated) | 5.6 |
| $FeCl_3 \cdot 6H_2O$ | 2.8 |
| HCl (36.5 percent) | 0.5 |
| Ethanol | 6.0 |

EXAMPLE 11

A roughened aluminum support, e.g. an electrolytically roughened support, is coated with a 0.8 percent solution in benzene of a copolymer prepared according to the method stated in Example 1 from 18 parts by weight of ethylene oxide and 2 parts by weight of 2-glycidoxy acetophenone, and then dried for 1 to 2 minutes at 100° C. Using the light source described in Example 1, the reproduction layer is image-wise exposed for 10 to 20 seconds in contact with a negative original.

The image may be made visible by one of the following methods:

(a) The plate is developed with a water spray, dried, moistened with a 1 to 2 percent alcoholic solution of a dyestuff, e.g. Victoria Blue B, and again rinsed with water. A positive blue copy of the original is obtained.

(b) After exposure, the entire layer is rubbed with Paratoner B. Upon subsequent treatment with a water spray, a sharp positive copy is obtained on the support in a strong red color.

EXAMPLE 12

Baryta paper is coated on a plate whirler with a 0.6 percent solution of a copolymer prepared as stated below from 19 parts by weight of ethylene oxide and 1 part by weight of a glycidylether of the following structure:

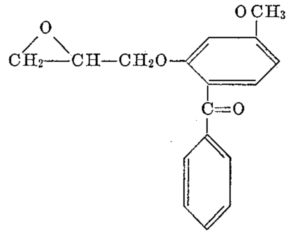

The plate is dried, first with a current of warm air and then for 2 minutes at 100° C. It is then exposed for 2–3 minutes in contact with a line original, using a 60 watt incandescent tungsten lamp of the firm Philips at a distance of 10 cm. After exposure, the entire reproduction layer is rubbed in with a pigment dye, e.g. pulverized Paratoner B, and then developed with a water spray. A red positive copy of the original is thus obtained.

The above-mentioned copolymer is prepared as follows: 100 parts by weight of toluene and 6.15 parts by weight of a catalyst solution consisting of 4.12 parts by weight of aluminum triethyl dissolved in 11.23 parts by weight of n-heptane and 6.94 parts by weight of diethyl ether, 0.31 part by weight of water and 1.76 parts by weight of acetyl acetone, are filled—in a nitrogen atmosphere—into a polymerization vessel which is protected against light. The mixture is heated to 60° C. and, while agitating, a mixture of 9.5 parts by weight of ethylene oxide and 0.5 part by weight of 2-benzoyl-5-methoxy-phenylglycidylether is cautiously added, drop by drop, over a period of 1 hour. After agitating for 7 hours at 60° C., the polymerization process is interrupted by adding 2 parts by weight of ethanol. The solution is evaporated at 50° C. under reduced pressure. Yield: 70 percent.

EXAMPLE 13

An electrolytically roughened aluminum foil is coated with the coating solution used in Example 5 (1 percent benzene solution with 0.1 percent of acetic acid added) and then dried, first in a current of warm air and then for 2 minutes at 100° C. A microfilm negative is projected by means of a conventional optical system onto the layer side of the foil at an enlargement scale of 1:10. A high-pressure mercury lamp of the type HBO 500 w. of the firm Osram is used as the light-source; the exposure time is 1 minute. The entire layer is then dyed with Carbon Black FW2, analogously to the method described in Example 11. When the plate is then cautiously rinsed with a water spray, a deep black positive enlargement of the microfilm original is obtained.

EXAMPLE 14

The procedure described in Example 3 is repeated, except that the following solution is used for coating:

10 parts by weight of a solution in benzene (solids content: 2.55%) of a copolymer prepared from 19 parts by weight of ethylene oxide, 0.5 part by weight of 4-glycidoxy benzophenone, and 0.5 part by weight of 4-glycidoxy acetophenone, 0.04 part by weight of a finely divided pure silicic acid, e.g. the product marketed by Degussa, Frankfurt am Main, under the designation "Aerosil MOX 170,"
0.04 part by weight of a polyethylene oxide having a molecular weight of approximately 4,000,000, and
0.002 part by weight of 2-phenylamino naphthalene, made up with benzene to a total of 5 parts by weight.

The coated material is exposed for 20 seconds under a negative with a 40 amp. carbon arc lamp. By treatment with Carbon Black FW (for paints) and subsequent spraying with water, a deep black positive copy of the original used is produced.

EXAMPLE 15

An electrolytically roughened aluminum foil is coated, on a plate whirler, with a 1.2 percent solution in benzene of a copolymer prepared, according to the method described in Example 1, from 95 parts by weight of ethylene oxide and 5 parts of weight of 3-glycidoxy benzophenone. For drying, the coated aluminum foil is heated for 2 minutes to 100° C. Exposure of the light-sensitive material thus prepared is as in Example 1, employing, however, an exposure time of 5 to 10 seconds.

The material is further processed as described in Example 11, under (b).

EXAMPLE 16

This example shows that only a very small quantity of the photo-active polymer to be used according to the invention need to be present in the light-sensitive layer:

90 parts by weight of ethylene oxide and 10 parts by weight of 4-glycidoxy benzophenone were copolymerized in toluene in accordance with the method described in Example 1 above. After 52 percent of the monomeric compounds present had participated in the reaction, the toluene solution of the copolymer contained 3.85 percent of copolymers. Part of the solution was mixed with polyethylene oxide (molecular weight: 600,000) and benzene in such quantities that a solution was obtained which contained 4.8 percent of polymers consisting to 2 percent of the light-sensitive copolymer and to 98 percent of polyethylene oxide. Aluminum foils having electrolytically roughened surfaces were coated with this solution and dried. Layers weighing 0.23 mg./cm.$^2$ were formed on the coated aluminum surfaces.

Two of the light-sensitive foils thus prepared were exposed for 30 seconds under a line negative under the conditions stated in Example 1.

One of the exposed foils was developed with a water spray, dried, wetted with a 1 to 2 percent alcoholic solution of Victoria Blue B, and again rinsed with water. A positive blue copy of the original was obtained.

The exposed layer on the other foil was rubbed in with Paratoner B and then sprayed with water. A red positive copy of the original was produced on the foil.

It will be obvious to those skilled in the art that many modifications may be made within the scope of the present invention without departing from the spirit thereof, and the invention includes all such modifications.

What is claimed is:

1. A supported light-sensitive reproduction layer which comprise at least one copolymer prepared from at least one epoxide of each of the following types I and II:

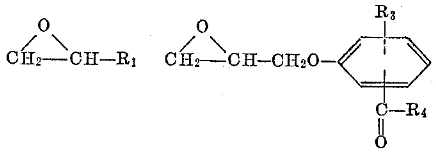

I II in which $R_1$ is selected from the group consisting of hydrogen, alkyl, aryl, halogenalkyl, and $CH_2OR_2$ wherein $R_2$ is selected from the group consisting of alkyl, allyl, vinyl and aryl; $R_3$ is selected from the group consisting of hydrogen, alkyl, alkoxy and halogen; and $R_4$ is selected from the group consisting of alkyl, phenyl, alkylphenyl, alkoxyphenyl, and halogenphenyl.

2. A reproduction layer according to claim 1 including at least one material selected from the group consisting of a dyestuff, a pigment, and a filler.

3. A reproduction layer according to claim 1 in which the ketone component II is present in the copolymer in a quantity in the range of about 0.01 to 10 mole percent.

4. A reproduction layer according to claim 1 in which the copolymer contains at least 50 percent by weight, based on the weight of the copolymer, of ethylene oxide, incorporated as component I by polymerization.

5. A photographic reproduction process which comprises exposing a supported light-sensitive layer to light under a master and developing the resulting image by treatment with a solvent, the layer comprising at least one copolymer prepared from at least one epoxide of each of the following types I and II:

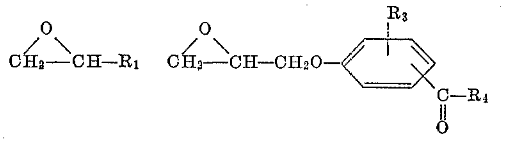

I II in which $R_1$ is selected from the group consisting of hydrogen, alkyl, aryl, halogenalkyl, and $CH_2OR_2$ wherein $R_2$ is selected from the group consisting of alkyl, allyl, vinyl and aryl; $R_3$ is selected from the group consisting of hydrogen, alkyl, alkoxy and halogen; and $R_4$ is selected from the group consisting of alkyl, phenyl, alkylphenyl, alkoxyphenyl, and halogenphenyl.

6. A photographic reproduction process according to claim 5 in which the layer includes at least one material selected from the group consisting of a dyestuff, a pigment, and a filler.

7. A photographic reproduction process according to claim 5 in which the exposed light-sensitive layer is colored with a pigment before development.

8. A photographic reproduction process according to claim 5 in which the ketone component II is present in the copolymer in a quantity in the range of about 0.01 to 10 mole percent.

9. A photographic reproduction process according to claim 5 in which the copolymer contains at least 50 percent by weight, based on the weight of the copolymer, of ethylene oxide, incorporated as component I by polymerization.

10. A photographic reproduction process according to claim 5 in which the solvent is selected from the group consisting of organic solvents, water, and mixtures thereof.

References Cited

UNITED STATES PATENTS

| | | | |
|---|---|---|---|
| 2,831,768 | 4/1958 | Merrill et al. | 96—115 |
| 3,200,086 | 8/1965 | Coleman | 260—2 |

NORMAN G. TORCHIN, Primary Examiner

RONALD H. SMITH, Assistant Examiner

U.S. Cl. X.R.

96—115, 33